United States Patent [19]
O'Farrell

[11] 4,290,855
[45] Sep. 22, 1981

[54] METHOD OF ISOTOPE ENRICHMENT
[75] Inventor: Patrick H. O'Farrell, San Francisco, Calif.
[73] Assignee: The Regents of the University of California, Berkeley, Calif.
[21] Appl. No.: 108,778
[22] Filed: Dec. 31, 1979
[51] Int. Cl.$^3$ ............ C25C 1/22; C25B 7/00; B01D 13/00
[52] U.S. Cl. .................. 204/1.5; 204/180 R; 204/299 R
[58] Field of Search ........... 204/1.5, 299 R, 180 R
[56] References Cited
U.S. PATENT DOCUMENTS

| | | | |
|---|---|---|---|
| 3,384,564 | 5/1968 | Ornstein et al. | 204/180 R |
| 3,705,845 | 12/1972 | Everaerts | 204/180 R |
| 3,793,177 | 2/1974 | Bumgartner et al. | 204/1.5 |
| 3,847,785 | 11/1974 | Allington | 204/299 |
| 3,869,374 | 3/1975 | Goldacker et al. | 204/1.5 |
| 4,090,937 | 5/1978 | Stoev et al. | 204/180 R |

FOREIGN PATENT DOCUMENTS 2743045  3/1979  Fed. Rep. of Germany ....... 204/1.5

OTHER PUBLICATIONS

"Criteria for Successful Separation by Continuous Electrophoresis and Electrochromatography in Blocks and Columns," Ravoo et al., Anal. Chim. Acta, vol. 38, 1967, pp. 219-232.
"Gegenstromionophorese, III, Neue Apparative Anordnung Zur Trennung Nach Dem Gegenstromprinzip," W. Preetz, H. L. Pfeifer, Anal. Chim. Acta, vol. 38, 1966, pp. 255-260.
"Gas Centrifuge," Donald R. Olander, Scientific American, vol. 239, No. 2, Aug. 1978, pp. 37-42.
"Laser Isotope Separation," V. S. Letokhov, Nature, vol. 277, Feb. 22, 1979, pp. 605-610.
"Enrichment Scheme," Scientific American, Aug. 1973, p. 43.
"Enrichment by Centrifugation," Scientific American, Aug. 1977, pp. 52-53.
"Laser Separation of Isotopes," Richard N. Zare, pp. 86-98.
"Displacement Electrophoresis," A. J. P. Martin, F. M. Everaerts, Anal. Chem. Acta, vol. 38, 1967, pp. 233-237.

Primary Examiner—Leland A. Sebastian
Attorney, Agent, or Firm—Townsend and Townsend

[57] ABSTRACT

Method and apparatus for separation of isotopes is provided which utilizes a novel combination of electrophoresis, a flowing carrier fluid and a separation chamber with varying separation characteristics. By selecting the appropriate voltage, flow rate and separation characteristics, a given ion species is made to form an equilibrium zone within the separation chamber. In a preferred embodiment, $^{235}U$ ions are continuously separated from $^{238}U$ ions.

18 Claims, 3 Drawing Figures

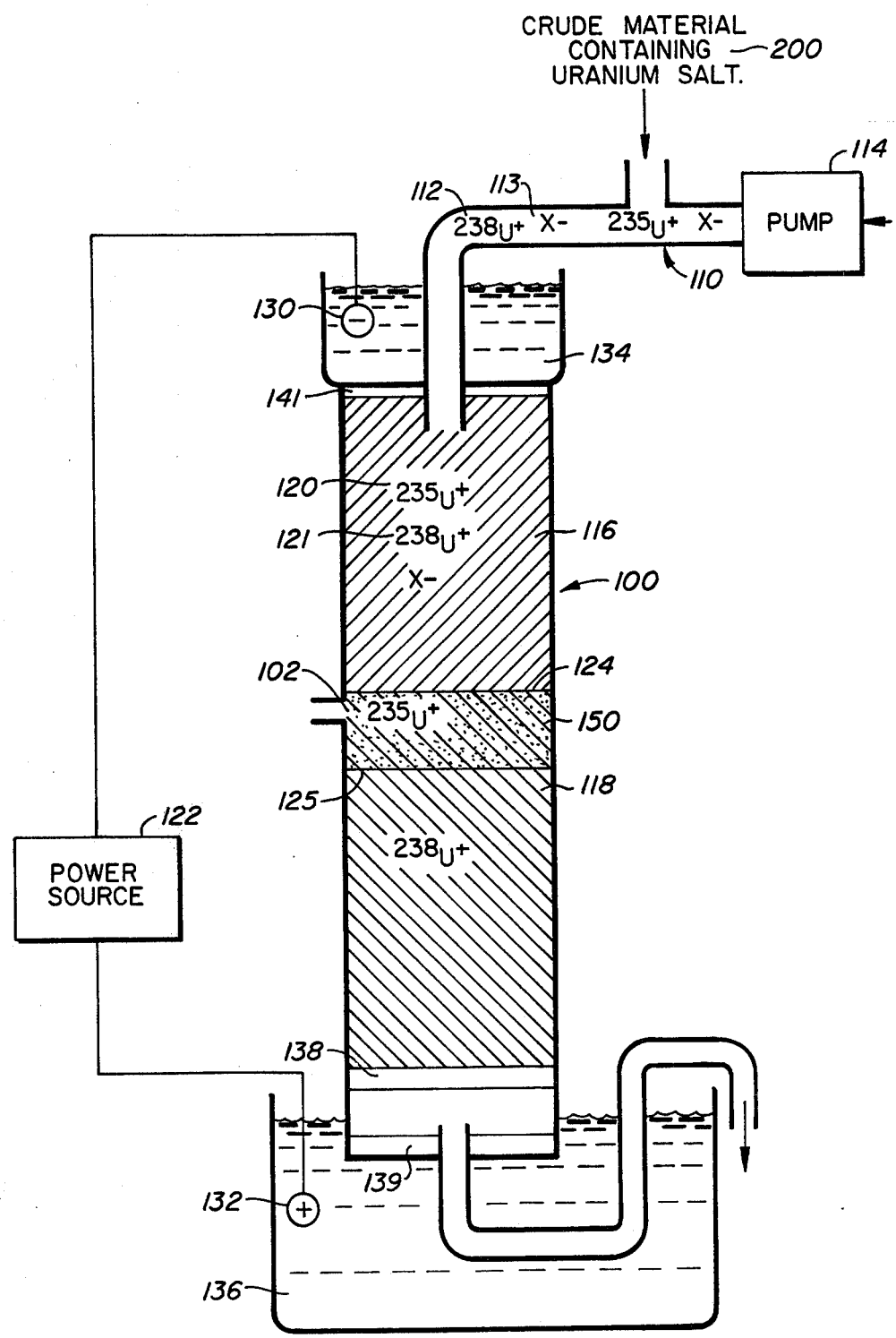
FIG._1.

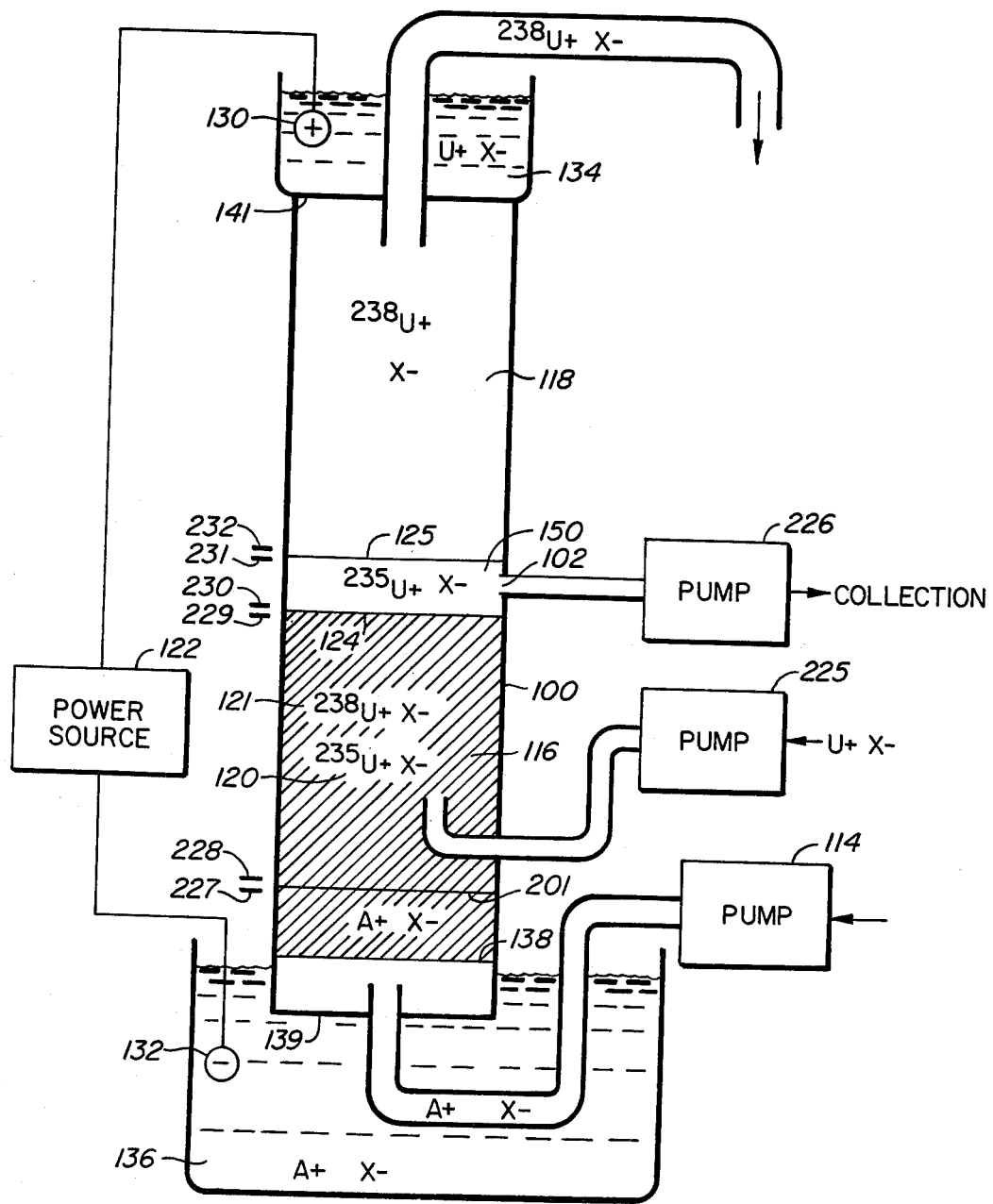
FIG._2.

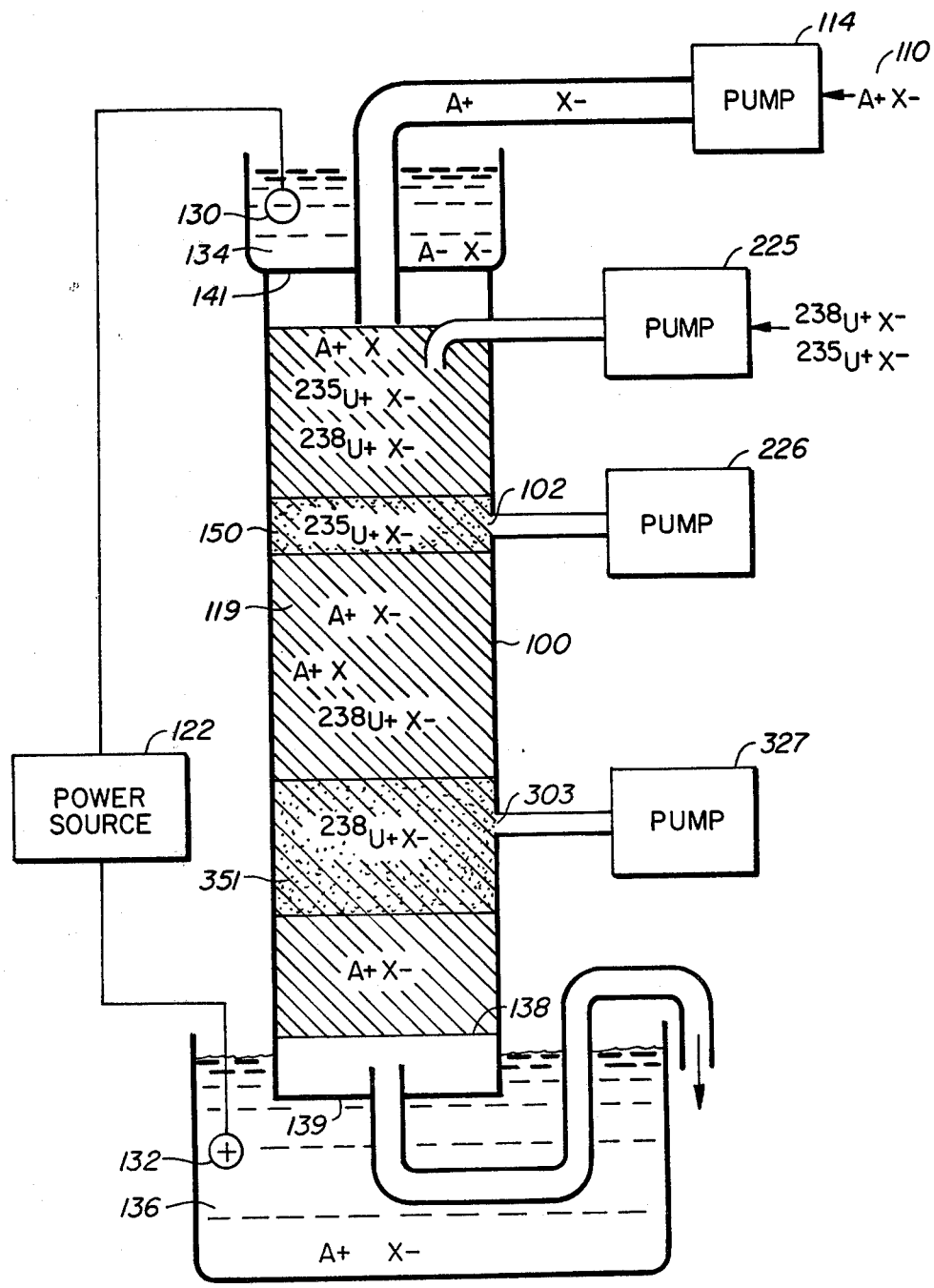
FIG._3.

METHOD OF ISOTOPE ENRICHMENT

BACKGROUND OF THE INVENTION

1. Field of Invention

This invention relates to a novel method of isotope purification and/or enrichment.

2. Brief Description of the Prior Art

The radiochemical industry requires methods of purifying radioactive isotopes (also stable isotopes with unusual mass) from the more abundant chemically identical isotopic forms. Most importantly, a large industry is involved in the enrichment of the isotope uranium-235 from natural uranium, 99.29 percent of which is uranium 238. To be used for powering nuclear reactors, the uranium-235 content is typically increased from 0.71 percent to 3 percent. Similarly, large scale enrichment plants exist for the isolation of the stable heavy isotope of hydrogen, deuterium, which is used in heavy water-cooled nuclear reactors.

Known processes for enrichment of uranium in the fissionable isotope uranium-235 include gaseous diffusion processes and gas centrifuge processes. Typically, such processes are multi-stage and involve significant capital outlay for equipment. For both the diffusion and the centrifuge processes the feed material is uranium hexafluoride, the only uranium-bearing compound that is gaseous at ordinary temperatures. In gaseous diffusion, the gas is blown through a series of thin, porous barriers. Because the $^{235}U$ atoms are lighter and thus faster than the $^{238}U$ atoms, the molecules having the $^{235}U$ atoms flow through each barrier more rapidly than those comprised of $^{238}U$ atoms. As such, successively richer concentrations of $^{235}U$ are segregated. Gaseous diffusion suffers from the disadvantage that large energy expenditures are required to achieve enrichment. Furthermore, because the enrichment achieved in any one step is small, a large multiunit plant is required. Additionally, the low enrichment levels make it impractical to recover more than a fraction of the uranium-235.

Centrifugation also utilizes the difference in the respective masses of the isotopes. Radial separation is induced by the centrifugal force established in a vertical spinning rotor, the $^{235}U$ atoms being concentrated at the core. The axial movement or separation of the two isotopes necessary for segregation is induced by a variety of precise temperature gradients and/or the presence of mechanical elements which affect the fluid dynamics of the gas in a manner which optimizes the axial separation. The net result is that the light isotope ($^{235}UF_6$) accumulates at one end of the machine and the gas at the opposite end is depleted in that isotope. The basic objective in designing a centrifuge is to produce the fastest and longest rotor possible, since separation increases with speed and is proportional to length. However, the level of materials technology and engineering, in general, impose practical limits on the size and speed of the rotors. For example, the peripheral speed of the rotor is limited by the ratio of strength to density of the material it is made of. The limit of the length of the machine is determined in part by the difficulty of controlling the straightness of the rotor, the uniformity of the wall in mass production manufacture, and by the durability of the bottom bearing, which must support the weight of the rotor. Another disadvantage of the centrifuge is that those with large length to diameter ratios have a problem getting up to operational speed, since they may pass through critical speeds at which large scale vibrations can occur. These problems are compounded by the fact that typically, three or more centrifuges are utilized in series as a "cascade."

Thus, although the gas centrifuge requires substantially less energy than gaseous diffusion, establishment of plants requires a large capital outlay and their maintenance involves high costs.

Another more recently developed method of isotope separation is laser separation which utilizes the differences in the electronic structure, i.e. in the electron clouds that surround the nuclei, of isotopes. The differences, though small, affect the wavelengths of light absorbed by the isotopes, i.e. each isotope absorbs light of a slightly different color. Because a laser emits light of a very pure color, it can thus be utilized to "tag," i.e. excite the electrons of, one isotope but not the other. Based on this principle several mechanisms for laser separation of isotopes have been proposed whereby a mixture of atoms or molecules containing more than one isotope is irradiated by a laser whose wavelength has been adjusted so that it excites the atoms of one isotope but has no effect on the others. Once the various isotopes are thus distinguished a variety of methods are then available for actually sorting them into different "bins." For example, application of an electric or magnetic field may be used to deflect the excited isotope along a different path from that followed by the unexcited one. Alternatively, instead of deflecting atoms which are excited but electrically neutral, another approach to laser separation techniques converts the excited isoptopes into ions which are more easily manipulated.

Still other classes of laser separation decompose molecules containing one isotope into stable products that can be simply removed from the mixture or utilize chemical scavengers which will react only with a molecule in its excited state. In addition to the similar disadvantage of the other laser techniques, i.e. requiring specialized and costly equipment, these techniques have the added difficulty of finding compounds which decompose into stable components or of finding appropriate scavenger molecules. The laser separation techniques have considerable potential but these have yet not been fully developed. These laser techniques all suffer from the disadvantage of retrieving only a small proportion of the available isotope. Thus, these techniques will require multiple stages with the accompanying reduction in efficiency and furthermore are unlikely to achieve complete recovery of the rarer isotope.

Accordingly, there is a need for a technique for isotope separation which has a high capacity and high degree of enrichment per stage, which recovers the large majority of the desired isotope, and which does not require large sophisticated equipment.

SUMMARY OF THE INVENTION

According to the present invention, a process and apparatus are provided whereby isotopes may be separated, purified or enriched utilizing dynamic equilibrium electrophoresis. The process of the present invention comprises a combination of electrophoresis, a flowing carrier fluid, and longitudinal variation in the separation characteristics of the separation chamber to produce equilibrium positions to which particular ions move.

In one embodiment, a separation system is provided wherein one compartment of the separation chamber contains a matrix of a type in which, at suitable flow rates and electrophoresis rates, the desired isotopes will electrophorese slightly faster than the desired isotopes will flow in the opposite direction, and a contiguous compartment of the separation chamber contains a second matrix in which the desired isotopes flow slightly faser than they electrophorese. Under the appropriate conditions, the result of the imbalances in the rates of electrophoretic migration and flow migration is that the desired isotope will migrate to the interface of the matrices, and will be concentrated there while impurities, including undesired isotopes, will be washed through the system.

The separation system of the present invention provides a high resolution method for purifying desired isotopes and, importantly, can be used for large scale amounts and/or on a continuous basis, while providing comparably high resolution coupled with high capacity and sufficient flexibility to be generally applicable.

BRIEF DESCRIPTION OF THE DRAWINGS

FIG. 1 is a fragmentary, elevational, sectional view taken along a vertical axis of an apparatus useful in a method of the present invention;

FIG. 2 is a fragmentary, elevational, sectional view taken along a vertical axis of an apparatus according to an embodiment of the present invention; and FIG. 3 is a fragmentary, elevational, sectional view taken along a vertical axis of an apparatus according to the present invention.

DETAILED DESCRIPTION

The electrophoretic mobility of an ion is proportional to the charge to mass ratio of that ion and by the method of the present invention it is possible to separate different isotopes on the basis of their differing mass. For example, an ionic form of uranium, the uranyl ion, would have about a 1 percent higher electrophoretic mobility if made from the lighter isotope, uranium-235, than if made from the heavier form, uranium-238. This difference in mobility allows separation.

The present invention utilizes the influence of the applied voltage and carrier fluid flow on an ion to effect separation. Ions, such as uranium ions, in solution or suspension, will migrate in an electric field at a rate $R_e$ (distance traversed per unit time) determined by (a) the electrical current, a, (amperes); (b) the electrical resistance of the carrier fluid, r; (c) the reciprocal of the cross-sectional area of the separation chamber, $1/A$; (d) the influence of the separation medium on the electrical resistance, $C_e$; (e) the electrophoretic mobility of the ion, $M_e$ (proportional to the total charge of the ion and inversely proportional to its total molecular weight) and finally, by (f) the medium through which the ions must migrate, $k_e$ (the factor by which a particular medium influences the electrophoretic mobility of a particular molecule), according to the following formula:

$$R_e = a \cdot r \cdot 1/A \cdot C_e \cdot M_e \cdot k_e \qquad (1)$$

Similarly, the ions in solution or suspension will move, when the carrier fluid is made to flow, at a rate, $R_f$ (distance traversed per unit time), determined by (a) the rate of flow of the entire solution, $dv/dt \cdot 1/A$ (the volume of solution flowing past a point over the time interval dt divided by the cross-sectional area A, of flow) and (b) the physical characteristics of the medium through which the ions must move, $k_f$ (the degree to which a particular medium influences the rate of flow of a particular ion). The movement due to flow is represented by the formula:

$$R_f = dv/dt \cdot 1/A \cdot k_f \qquad (2)$$

In the process of the present invention, the electrophoretic movement of the ion to be concentrated or purified is counterbalanced by movement due to flow in the opposite direction. In addition, the medium in which the separation occurs is heterogeneous, i.e. has varying separation characteristics, and results in an equilibrium force which counteracts diffusion and concentrates the desired ion in an equilibrium zone. The terms r, $1/A$, $C_e$, $M_e$, $k_e$ and $k_f$ are referred to as separation characteristics. The terms $C_e$, $M_e$, $k_f$ and $k_e$ are also referred to as medium characteristics. It should be noted that, although the following description emphasizes the use of the present invention for the enrichment of uranium-235, the method is general and can be applied to other isotopes.

FIG. 1 depicts one embodiment of the present invention in which two different matrices 116, 118 are utilized in the separation chamber 100 to produce equilibrium. A carrier solution 110 pumped by a pump 114 flows down through a first support matrix 116 of type i then through a second support matrix 118 of type ii. The matrices i, ii are selected for their differing influence on either the electrophoresis rate or flow rate of uranium ions 120, i.e. $k_e/k_f$ for matrix i is not the same as $k_e/k_f$ for matrix ii. For example, if $k_e$ and $C_e$ are the same for matrix i and ii, and $k_f$ for matrix i ($k_{fi}$) was twice $k_f$ for matrix ii ($k_{fii}$), then the electrophoresis rate ($R_e$) of $^{235}U^+$ ion 120 will be the same in matrix i 116 and matrix ii 118 ($a \cdot r \cdot 1/A \cdot C_{ei} \cdot M_e \cdot k_{ei} = a \cdot r \cdot 1/A \cdot C_{eii} \cdot M_e \cdot k_{eii}$). However, the flow mobility ($R_f$) of $^{235}U^+$ ion 120 will be twice as great in matrix i as in matrix ii ($dv/dt \cdot 1/A \cdot k_{fi} = dv/dt \cdot 1/A \cdot 2 \times k_{fii}$). That is, even though the carrier fluid 110 is flowing at the same rate ($dv/dt \cdot 1/A$) in matrix i 116 and matrix ii 118, the $^{235}U^+$ ion 120 flows at twice the rate in matrix i 116 as it does in matrix ii 118 ($R_{fi} = 2 \cdot R_{fii}$). Thus, when a voltage of a particular magnitude is applied by a power source 122 such that the electrophoresis rate ($R_f$) for $^{235}U^+$ ion 120 is less than $R_{fi}$ but greater than $R_{fii}$ ($R_{fi} > a \cdot r \cdot 1/A \cdot C_e \cdot M_e \cdot k_e > R_{ii}$), then the electrophoresis rate of the $^{235}U^+$ ion 120 and the flow rate of the $^{235}U^+$ ions 120 are imbalanced in both support matrix i 116 and matrix ii 118. In matrix i 116 the flow rate dominates, i.e., the ratio of the magnitudes of $R_{fi}$ to $R_{ei}$ is greater than 1, and the net rate of movement in compartment i, $R_i$, will be $R_{ei}-R_{fi}$ where movement in the direction of electrophoresis is defined as positive. In matrix ii 118 the electrophoresis rate dominates, i.e. the ratio of $R_{fii}$ to $R_{eii}$ is less than 1, and the net rate of movement in compartment ii, $R_{ii}$, will be $R_{eii}-R_{fii}$. Thus, the $^{235}U^+$ ions 120 concentrate at the boundary 124 of the two matrices 116, 118 and are not able to diffuse away because the described forces return the $^{235}U^+$ ions 120 to the boundary 124. The only ions which will concentrate at the boundary are those which satisfy the inequality, $R_{fi} > R_e > R_{fii}$.

Typically, because their electrophoretic mobilities are so similar, $^{235}U^+$ and $^{238}U^+$ ions will satisfy the inequality under very similar conditions. Thus, it would be difficult to select conditions where only $^{235}U^+$ ions would concentrate at the boundary of the two matrices. Nonetheless, these two isotopic forms can be separated according to the present invention because they will form distinct equilibrium zones adjacent the boundary of the two compartments. By compartment is meant a portion or region of the separation chamber in which a particular species of ion has a unique ratio of its movement due to flow and movement due to electrophoresis under particular conditions, e.g. when the electric field, rate of carrier fluid flow and composition of the carrier fluid are constant and where ions other than those of the carrier fluid are at an insignificant concentration. In this example the compartments correspond to the regions of the separation chamber occupied by matrix i and matrix ii. The formation of distinct equilibrium zones is explained as follows.

Since the ions under consideration, $U^+$ ions, are not at equilibrium in either compartment i or compartment ii, an additional factor must be involved in the formation of the equilibrium zone. The additional factor is the concentration of the $U^+$ ions. The $U^+$ ions will migrate toward the boundary of compartments i and ii. First, considering only $^{235}U^+$ ions, as the concentration of $^{235}U^+$ ions increases at the boundary, $R_e$ and $R_f$ will be affected such that $R_e' = R_e \cdot f_1(c)$ and $R_f' = R_f \cdot f_2(c)$ where $R_e'$ is the rate of movement due to electrophoresis when influenced by the concentration of $^{235}U^+$ ions, $R_f'$ is the rate of movement due to flow when influenced by the concentration of $^{235}U^+$ ions, and $f_1(c)$ and $f_2(c)$ are correction factors which vary as a function of the concentration, c, of the ion forming the equilibrium zone, $^{235}U^+$. Consider the following specific case: Increasing concentrations of $^{235}U^+$ ions cause $R_e'$ to decrease but have no effect on $R_f'$, e.g. $R_e' = R_e \cdot 1/c$ and $R_f' = R_f \cdot 1$. Thus, as $^{235}U^+$ ions accumulate at the boundary of the two compartments $R_e'$ will decrease until it equals $R_{fii}$ and will thereby establish an equilibrium zone where one of the boundaries of the zone correspond to the boundary of compartments i and ii and the other boundary lies within compartment ii. The position of the boundary within compartment ii, and thus the size of the zone, depends on the amount of $^{235}U^+$ ions in the equilibrium zone. That is, if the amount of $^{235}U^+$ ions were to decrease, then the concentration, c, would decrease and $R_e'$ would increase which would force the $^{235}U^+$ ions toward the boundary of compartments i and ii, thereby concentrating the $^{235}U^+$ ions and reestablishing an equilibrium zone. Similarly an increase in $^{235}U^+$ ions would cause $R_e'$ to decrease so the movement due to flow ($R_{fii}$) would dominate and $^{235}U^+$ ions would move further into compartment ii to establish a larger equilibrium zone where, once again, $R_e' = R_{fii}$. Thus, it is clear that the equilibrium zone is self-regulating and the concentration of $^{235}U^+$ ion is maintained at just that level which causes $R_e'$ to counterbalance $R_{fii}$. It will be understood that the values of $f_1(c)$ and $f_2(c)$ will differ for different separation conditions and different ions. However, the values of $f_1(c)$ and $f_2(c)$ do not have to be known; an equilibrium zone will form in all cases except for the unlikely case where $f_1(c) = f_2(c)$. It will be apparent to one skilled in the art that an equilibrium zone abutting the boundary of compartment i or ii can lie in either compartment i or ii and that this will be determined by the values of $f_1(c)$ and $f_2(c)$ and the particular conditions.

Returning now to the explanation of why $^{235}U^+$ ions and $^{238}U^+$ ions will form distinct equilibrium zones, consider the behavior of $^{238}U^+$ ions in the above described example where $^{235}U^+$ ions are trapped in an equilibrium zone bordering compartments i and ii but lying in compartment ii. For the instant example, $^{238}U^+$ ions are also assumed to satisfy the inequality $R_{fi} > R_e > R_{fii}$ and thus should form an equilibrium zone. However, note that since $R_e$ for $^{238}U^+$ ions is less than $R_e$ for $^{235}U^+$ ions, the $^{238}U^+$ ions will not be at equilibrium within the equilibrium zone for $^{235}U^+$ ions. Within the equilibrium zone of $^{235}U^+$ ions, the rate of movement of $^{238}U^+$ ions due to electrophoresis will be about $0.99 \cdot R_e'$ and thus the $^{238}U^+$ ions will be forced to a position between the equilibrium zone of $^{235}U^+$ ions and the remainder of compartment ii. Furthermore, as described for the equilibrium zone for $^{235}U^+$ ions, $^{238}U^+$ ions will form a second equilibrium zone in which the concentration of $^{238}U^+$ ions will be automatically regulated so that the rate of movement due to electrophoresis precisely counterbalances their movement due to flow. Since the $^{238}U^+$ ions are the more abundant ions, continued addition of uranium salts to the separation system will lead to an expansion of the equilibrium zone of $^{238}U^+$ ions until this equilibrium zone fills that part of compartment ii not occupied by the equilibrium zone of $^{235}U^+$ ions (FIG. 1) at which point additional $^{238}U^+$ ions will be eluted with the fluid flowing from the separation system. Thus, in effect, $^{235}U^+$ ions will be the only ions concentrating adjacent the boundary of compartments i and ii and the $^{235}U^+$ enriched material can be collected from this position of the separation chamber.

Although the present invention is described in terms of the separation of uranium isotopes it will be known and understood by those skilled in the art that the descriptions herein provided are equally applicable to all other isotopes, e.g. hydrogen and deuterium, isotopes of carbon, sulfur, chlorine, oxygen, and the like.

For purposes of the present invention any one of a large number of commercially available electrical power sources 122 having a stable direct current output can be used. The voltage V, applied to the system is chosen as dictated by separation requirements. That is, the electrical current, a, is directly proportional to the applied voltage and thus, by equation 1, the electrophoresis rate is proportional to the input voltage. Means for applying the voltage are those known in the art. The electrodes 130, 132 are typically isolated from the separation chamber 100 by having the electrodes contact the solution in reservoirs 134, 136 which are connected to the separation chamber 100 by liquid contacts 139, 141, e.g. a membrane barrier or matrix (different from the support matrices discussed above) which resists fluid flow but does not resist the electric current flow through the solution.

Similarly any pump 114 capable of maintaining a constant output may be utilized to pump the fluid 110 through the separation chamber 100. The pumping rate chosen is as dictated by the separation requirements. That is, the flow rate (equation 2) is proportional to the pumping rate which can be selected to give the desired equilibrium.

The separation chamber 100 can be of almost any form as demanded by the particular separation technique. The material contacting the solution is typically a non-conductor of electricity. The chamber is usually closed, except for exit and input ports 102, and impermeable to the solution so that constant fluid flow can be maintained. A preferred separation chamber is a vertical cylindrical chamber (column), typically glass or suitable plastic, in which the fluid flows in the downward direction and electrophoresis drives the desired molecules in the upward direction. A mesh on the bottom 138 of such a column supports the matrices which fill the cavity of the column. Port 102 can be included to permit withdrawal of the purified $^{235}U+$ ions 120 from the equilibrium point.

A wide range of support matrices have been developed for use in liquid chromatographic procedures. These same matrices can be used in the procedures of the present invention. Some of these matrices may have a different effect on the mobility of ions of interest driven by flow than they have on the electrophoretic mobility of these molecules and theoretical considerations indicate that virtually all such matrices will have the desired differential influence on mobilities. Because of the variety of such matrices, and the variety of their modes of interaction with particular molecules, it is possible, as will be known and understood by those skilled in the art, to separate ions on the basis of virtually any chemical/physical property (e.g., molecular size, ionic character, hydrophobicity, and electrophoretic mobility), by selecting the right matrices.

A preferred embodiment of the present invention for large scale applications is a continuous flow process. By continuous flow process is meant a process wherein the impure raw material is fed into the system continuously and the purified product removed continuously. Accordingly, the present invention provides a simple means of operating separation as a continuous flow process. As shown in FIG. 1, the crude material containing uranium salt 200 is fed into the separation chamber 100 with the flowing solvent 110. Port 102 is disposed on the separation column just below the common boundary 124 of the two matrices 116, 118 (below if flow is down through matrix i first and then matrix ii, electrophoresis is up, and the $R_f \cdot R_e$ is greater than 1 in matrix i and less than 1 in matrix ii) and both carrier fluid 110 and the purified $^{235}U+$ ions 120 can be withdrawn from the equilibrium zone 150, provided only that the following requirements be satisfied: (a) either the $^{235}U+$ ions 120 of interest must be the only component which comes to equilibrium in the separation system or if several ions come to equilibrium, it must form the first equilibrium zone (the one bordering on the common boundary 124 of the two matrices 116, 118) so that its position will not change with time, (b) the rate of fluid 110 withdrawal from the port 102 must not perturb the flow through the separation chamber 100 to an extent which would destroy the equilibrium force. This design offers high capacity and efficient use of power.

The embodiment shown in FIG. 1 may be modified to include (a) the incorporation of sensors to regulate the rate of input of crude material and withdrawal of purified product; (b) a method of inputting the crude material which would avoid any loss to the electrode reservoirs, and (c) elimination of carrier ions from the separation chamber so that the efficiency of utilization of electric power would be increased.

FIG. 2 shows a preferred embodiment. A carrier solution containing $A+X-$ is pumped into the separation chamber by pump 114. The positive ions, $A+$ ions, in the carrier solution have a higher electrophoretic mobility than the ions to be separated, e.g. $U+$ ions. The crude material, e.g. a solution of a salt of natural uranium such as uranylacetate, is pumped into the separation chamber by pump 225. Following principles described by Orstein in U.S. Pat. No. 3,384,564, when a voltage is imposed, the rapidly migrating $A+$ ions will not mix with the more slowly moving $U+$ ions and a distinct boundary 201 will form between the solution containing $U+$ ions and the solution containing $A+$ ions. Although this boundary 201 between $A+$ and $U+$ ions would normally move toward the negative electrode, in the method of the present invention this movement is counterbalanced by the flowing solution. To ensure that the boundary 201 is maintained in a stable position, pump 114 is regulated by two sensors 227, 228. Typically, sensors 227, 228 are radiation detectors, e.g. Geiger counters, which detect the presence of $^{235}U$. As the amount of radioactivity increases and is detected by sensor 227, the pumping rate of pump 114 increases and the increased flow moves the $U-$ ions further into the separation chamber 100. Similarly, as the level of radioactivity detected by sensor 228 decreases, the pumping rate of pump 114 is decreased.

The additional flow due to the action of pump 225 causes the $U+$ ions to move through compartment i 116 toward the interface of compartment i and compartment ii 124. To those skilled in the art, it will be apparent that within compartment i, 116, the $U+$ ions will electrophorese at the same rate as the $A+$ ions and as the boundary between these ions and thus in the absence of the flow from pump 225 the movement of $U+$ ions due to electrophoresis according to the instant invention will be precisely counterbalanced by the flow induced by pump 114.

If $R_{ii} > O$ for both $^{235}U+$ and $^{238}U+$ ions, then both these uranium ions will form equilibrium zones adjacent the boundary of compartment i and ii 124. However, as described above, the equilibrium zone composed of $^{238}U+$ ions will quickly fill up compartment ii 118 and therefore only the equilibrium zone for $^{235}U+$ ions 150 is shown in FIG. 2. The $^{235}U+$ ions are collected from the equilibrium zone by the action of pump 226. The sensors 229, 230 are used to regulate pump 225 to obtain maximum throughput. Because of diffusion, the $^{235}U+$ ion concentration in compartment i will be somewhat elevated adjacent to the boundary 124 of compartments i and ii. This elevated level of $^{235}U+$ ions will be detected by sensor 229 which will increase the pumping rate of pump 225. Additionally, sensor 230 can monitor the concentration of $^{235}U+$ ions within the equilibrium zone to ensure that the flow rate does not exceed the range in which the equilibrium zone can be maintained. Similarly, sensors 231 and 232 can regulate the pumping rate of pump 226 so that the rate of collection can match the rate of accumulation.

Ion exchange matrices can be used to provide the required differential affect on the flow mobility and electrophoretic mobility of the uranyl-235 ion 120. For example, a cationic exchange resin used as matrix i in compartment i 116 provides the desired effect. Although this resin will not interact strongly with the uranyl-235 ion, it will bind the counter ion (e.g., acetate), and as a result the salt concentration and the electrical conductivity will increase in this zone. Consequently, the voltage gradient will decrease, reducing the electrophoretic mobility in this matrix. As a second matrix ii in compartment ii 118 either an inert matrix could be used or, in fact, this region of the separation chamber can be left as free carrier fluid (viz, $k_e$ in the free solvent will differ from $k_e$ in matrix i).

FIG. 2 depicts a preferred embodiment wherein compartment ii of the separation chamber comprises free carrier fluid rather than a second matrix. In the embodiment of FIG. 2, the electrodes and thus the direction of flow have been reversed to illustrate such a possibility.

Otherwise operation is similar to that described with regard to FIG. 1.

FIG. 3 depicts another embodiment which utilizes a gradient matrix in the separation chamber to produce multiple compartments each differing in separation characteristics, e.g. $R_e/R_f$ for a particular ion would vary through the separation chamber. Typically a gradient matrix would be produced by mixing in different proportions two matrices with differing characteristics. In this process two different ions might satisfy the boundary conditions and form equilibrium zones, but these equilibrium zones could occupy different regions of the separation chamber and are unlikely to be contiguous. In FIG. 3 a carrier fluid 110 containing carrier ions $A^+$ and $X^-$ is pumped by pump 114 into the separation chamber 100 which is filled with a gradient matrix 119. The power supply 122 imposes a voltage across the separation chamber 100 such that the positively charged (in this instant example) ions electrophorese in the direction counter to the fluid flow. The ions to be separated $^{235}U^+$ and $^{238}U^+$ are fed into the separation chamber 100 by pump 225. In those areas of the column where electrophoresis dominates the particular ions will move in the direction of electrophoresis while in those regions where flow dominates they will move in the direction of flow and for those ions which satisfy the boundary conditions the ions will concentrate in that region of the separation chamber where the rates of movement due to flow and electrophoresis are balanced. Because a multitude of compartments exist in the gradient matrix even ions with very similar mobilities can form separate equilibrium zones 150, 351. If desired the different ions can be removed from their respective equilibrium zones. Accordingly, pump 226 can remove a solution rich in $^{235}U^+$ ions via port 102 from equilibrium zone 150. Similarly, pump 327 can remove a solution rich in $^{238}U^+$ ions via port 303 from equilibrium zone 351. This process could be useful when high purification ratios are needed.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

I claim:

1. A method for separating in a separation chamber having longitudinally varying separation characteristics at least one isotope from a mixture of isotopic species in which the isotopic species exist as ions and comprising the steps of:
   introducing said mixture into said chamber;
   imparting said species with a movement in a first direction by flowing a carrier fluid through said chamber; and
   applying an electric field across said chamber to electrophorese said species in a second direction counter to said first direction to segregate each of said species in an equilibrium zone within the chamber.

2. A method according to claim 1 further comprising the step of removing said at least one isotope from the equilibrium zone of said isotopic species.

3. A method according to claim 2 wherein said step of removing is continuous.

4. A method according to claim 3 wherein said step of introducing is continuous.

5. A method according to claim 1 or 4 further comprising the step of detecting said zones by detection means.

6. A method according to claim 1 further comprising providing in said chamber a gradient matrix having continuously varying medium characteristics.

7. A method according to claim 1 further comprising providing in said chamber at least two contiguous matrices whereby at least one of said equilibrium zones will abut the common boundary of said matrices.

8. A method according to claim 1 further comprising providing in said chamber at least one matrix of uniform medium characteristics contiguous to a volume of free flowing carrier fluid whereby at least one of said equilibrium zones will abut the common boundary of said matrix and said volume.

9. A method according to claim 1 wherein said at least one isotope is uranyl-235+.

10. A method according to claim 1 wherein said at least one isotope is deuterium.

11. A method of concentrating positively charged $^{235}U$ ions from a mixture of positively charged $^{235}U$ and $^{238}U$ ions in a separation chamber provided with positive and negative electrodes and having first and second contiguous compartments between said electrodes, said first compartment being positioned between said negative electrode and said second compartment, said method comprising the steps of:
   flowing a carrier fluid comprising $^{235}U$ and $^{238}U$ ions through said chamber, whereby said $^{235}U$ and $^{238}U$ ions are imparted with a movement due to said flow in the direction of said positive electrode; and
   applying an electric field across said electrodes whereby said $^{235}U$ and $^{238}U$ ions are imparted with a movement due to electrophoresis in the direction of said negative electrode, said electric field having a magnitude such that $^{235}U$ ions when in said first compartment have a net movement in the direction of said positive electrode and when in said second compartment have a net movement in the direction of said negative electrode, whereby said $^{235}U$ ions accumulate in said first compartment in a region adjacent the common boundary of said first and second compartments.

12. A method according to claim 11 further comprising the step of removing said concentrated $^{235}U$ ions from a port disposed adjacent said region.

13. A method according to claim 12 wherein said step of removing further comprises removing at a rate substantially equal or less than the rate of accumulation of said $^{235}U$ ions.

14. An apparatus for segregating at least one species of ions, said apparatus comprising:
   means for producing longitudinally varying separation characteristics within a separation chamber;
   means for imparting movement to said ions in a first longitudinal direction within the chamber; and
   means for electrophoresing said ions in a second direction counter to said first direction to segregate said species into equilibrium zones within the chamber.

15. An apparatus according to claim 14 further comprising means for removing said species from said chamber.

16. An apparatus according to claim 14 further comprising means for detecting said equilibrium zones.

17. An apparatus according to claim 15 wherein said removing means further comprises means for continuously removing said species.

18. An apparatus according to claim 16 wherein said removing means further comprises means for continuously removing said species and said detecting means further comprises means for controlling said removing means.

* * * * *

UNITED STATES PATENT AND TRADEMARK OFFICE
CERTIFICATE OF CORRECTION

PATENT NO. : 4,290,855
DATED : September 22, 1981
INVENTOR(S) : Patrick H. O'Farrell, San Francisco, California.

It is certified that error appears in the above-identified patent and that said Letters Patent are hereby corrected as shown below:

Column 3, line 7 change "faser" to --faster--.

Signed and Sealed this

Fifteenth Day of December 1981

[SEAL]

Attest:

GERALD J. MOSSINGHOFF

Attesting Officer — Commissioner of Patents and Trademarks